Oct. 2, 1962   D. S. GREY   3,056,341
PHOTOGRAPHIC SHUTTER MECHANISM
Filed May 15, 1958   4 Sheets-Sheet 1

INVENTOR.
David S. Grey
BY
Brown and Mikulka
ATTORNEYS

Oct. 2, 1962     D. S. GREY     3,056,341
PHOTOGRAPHIC SHUTTER MECHANISM
Filed May 15, 1958     4 Sheets-Sheet 2

INVENTOR.
David S. Grey
BY
Brown and Mikulka
ATTORNEYS

Oct. 2, 1962  D. S. GREY  3,056,341
PHOTOGRAPHIC SHUTTER MECHANISM
Filed May 15, 1958  4 Sheets-Sheet 4

INVENTOR.
David S. Grey
BY
*Brown and Mikulka*
ATTORNEYS

United States Patent Office 3,056,341
Patented Oct. 2, 1962

3,056,341
PHOTOGRAPHIC SHUTTER MECHANISM
David S. Grey, Lexington, Mass., assignor to Polaroid Corporation, Cambridge, Mass., a corporation of Delaware
Filed May 15, 1958, Ser. No. 735,484
22 Claims. (Cl. 95—59)

This invention relates to photographic devices and particularly to exposure control mechanisms and improvements of the invention disclosed in the copending application, Serial No. 735,620, filed May 15, 1958, by Edwin H. Land and David S. Grey for Exposure Control Mechanism.

Exposure control mechanisms for photographic devices wherein shutter exposure time has been regulated by incorporating a means for mechanically governing shutter speed are well known and old in the art. Adjustments in shutter speed of these mechanisms had been made by manual manipulation in accordance with the operator's photographic judgment, and later, with the advent of the electric photocell, in accordance with readings made by the operator of a photometer. Attempts to bypass the operator's function by coupling the photocell with the governing means have since been made. However, such coupling of a photosensitive means with a mechanical governing means requires an intermediate device for translating the output of the photosensitive means into mechanical displacements for controlling the governing means. In such a governing means, as for example a pneumatic control element, the governing effect of which is a function of fluid flow in the element, an intermediate means, such as a valve, is required for converting electrical signals from a photocell into mechanical displacement to control the fluid flow. Although the operation of such mechanisms has been essentially satisfactory, they are nevertheless predisposed to those ills to which mechanical devices are inherently vulnerable and which might affect the "time-keeping" qualities of the shutter. For instance, such effects as thermal deformation of linkages, friction, wear-imposed changes in mechanical clearances, and the deposit of contaminants such as dust or oxidized lubricants at critical points may well result in impairment of the mobility of shutter elements.

Additionally, in regard to many mechanically governed shutters, yet another difficulty exists concerning the practical aspects of picture taking. It is desirable that, in operation, the "time-to-open" interval between the actuation of the shutter mechanism and the opening or uncovering of an exposure aperture be quite brief. Unfortunately, in many such mechanisms long exposures have a substantially longer "time-to-open" interval than do short exposures. Where a wide range of exposure time is desired, the "time-to-open" interval may be impractically long for many associated exposure time values.

Accordingly, one object of this invention is to provide an electromagnetic means for controlling shutter speeds. Another object of this invention is to provide an exposure control device for a shutter mechanism which includes a movable means characterized in that the exposure time of said mechanism is a function of the speed of movement of said movable means, said control device comprising an electromagnetic means having a first magnetic field associated therewith and having means movable within said first magnetic field responsively with movement of said movable means for inducing a second magnetic field, said magnetic fields interacting for controlling the speed of movement of said movable means. Other objects of this invention are to provide such an exposure control device wherein the "time-to-open" interval is in the order of magnitude of the desired exposure interval; to provide a photoresponsive exposure control mechanism wherein the electrical signals from a photosensitive means variably cooperate with a magnetic field force which acts upon a shutter means for controlling shutter speed; to provide a photoresponsive exposure control mechanism comprising a photosensitive means for producing electrical signals in accordance with the intensity of light incident thereon, means for defining an exposure aperture, a shutter means mounted for covering and uncovering movement relative to said aperture, exposure time through said aperture being a function of the speed of said uncovering and covering movement, and electromagnetic means cooperating with said shutter means responsively to said electrical signals for controlling the speed of said movement; and to provide a photoresponsive exposure control mechanism comprising, in combination, a photosensitive means for producing electrical signals in accordance with the intensity of light incident thereon, means for defining an exposure aperture, a shutter means mounted for movement in sequence between a first position wherein said shutter means completely covers said aperture, a second position wherein said shutter means uncovers said aperture, and a third position wherein said shutter means again covers said aperture, said shutter means being movable from said second to said third position during a variable time interval, means for accelerating said shutter means to at least the highest speed required to effect a desired exposure time interval and during movement of said shutter means from said first position to said second position, and control means for varying shutter speeds within said speed range responsively to said electrical signals, thereby varying said time interval, said control means comprising an electromagnetic means which is electrically coupled with said photoelectric means, said electromagnetic means comprising a first element having a magnetic field and a conducting element disposed within said field, one of said elements being so connected with said shutter means as to be movable therewith with respect to the other of said elements, said conducting element so cooperating with said magnetic field that said movement of said shutter means is governed by the electromagnetic coupling of said field and said conducting element responsively to said electrical signals.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
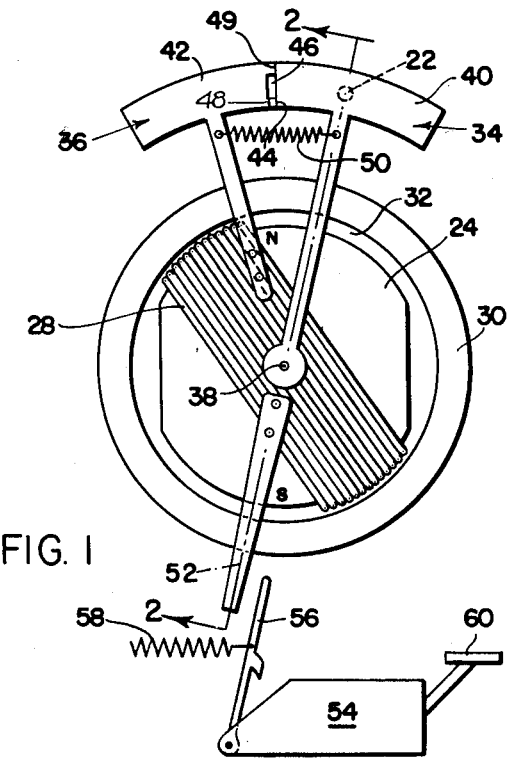
FIGURE 1 is a schematic plan view of a device embodying the invention.

Generally, this invention relates to shutter mechanisms utilizing an electromagnetic apparatus for a speed governing device in distinction to those shutter speed controls which employ a mechanical control system. The term "electromagnetic" as used herein is to be construed as the interaction of electricity and magnetism in the "mechanical" sense and not, for instance, as used in the phrase "electromagnetic radiation." An electromagnetically controlled shutter mechanism is particularly well adapted for use as a photoresponsive shutter mechanism wherein the controlling parameter comprises the electrical signals produced by a photosensitive means in accordance with the intensity of light incident thereon. With the use of electromagnetic control of shutter speed in photoresponsive shutter mechanisms, one may dispense with amplifiers, both electrical and mechanical, and generally with intermediate translating devices which hitherto have been necessary to convert the photocell output to a useful form. Additionally, other auxiliary devices such as switches to cut out photocell current during exposure or restraining devices to hold the speed control in a fixed position during exposure, may no longer be needed.

The present invention comprehends a shutter mechanism for a photographic device, said mechanism comprising means for defining an exposure aperture, and a shutter element such as a blade cooperating with the exposure aperture to establish an exposure time interval therethrough, the interval being a function of the speed of the shutter element. Means are provided for imparting an aperture-uncovering movement to the shutter element. As a means for controlling the speed of the aperture-uncovering movement of the shutter blade there is provided an electromagnetic element, a portion of which is movable responsively with the shutter blade. The controlling effect of the electromagnetic element may be varied by manual adjustment. In the preferred embodiment of the present invention, there may be associated with the shutter mechanism a photosensitive means such as any of the photovoltaic or photoconductive cells known in the art. In the latter event, the electromagnetic element is so electrically coupled with the photosensitive means as to be responsive to the electrical output thereof and consequently the element governs the speed of movement of said portion of the shutter blade in accordance with the intensity of light incident upon the photosensitive means.

Fundamentally, the electromagnetic element comprises a magnetic element with which a first magnetic field may be associated, the magnetic element preferably comprising a permanent magnet having a permanent magnetic field. Disposed to be within said first field is an electrically conducting member, either or both the electrically conducting member and the magnetic element being movable with respect to one another. The current induced by relative movement of the electrically conducting element approximately perpendicularly to the first magnetic field is, according to well known physical laws, proportional to the speed of relative movement, the cross-sectional area and the conductivity of the electrically conducting member and the strength of said field, and is in a direction such that a transient magnetic field associated with the current is opposed to the first magnetic field of the magnetic element, thereby providing an opposition of forces or coupling which is used in the present invention to control the speed of the shutter blade.

It has been noted that one of the difficulties in shutter speed control devices lies in the "time-to-open" interval. Where the desired exposure is comparatively short, for example, in the nature of $\frac{1}{1000}$ of a second, generally the speed of the shutter blade is comparatively fast. In reaching the fast speed, the blade, moving across a distance from the rest position to the open position with respect to the aperture, may be accelerated rapidly and hence traverse the distance in a comparatively short time interval. However, where a comparatively long exposure is desired, the relation between long and short exposures, for instance, being approximately in the ratio of 100 to 1, the small acceleration required to bring the blade to the slow speed may result in the blade traversing the distance between the rest position to the open position in a comparatively long interval. Because of the real possibilities that the subject matter may alter its position during such long interval, that the alignment of the photographic device relative to the subject may shift during the long interval, or that the operator generally tends to move the camera almost immediately following actuation, the undesirability of a prolonged "time-to-open" interval is apparent. The problem becomes aggravated when a control device, as herein contemplated, is attached to the shutter blade. One form of the present invention therefore comprehends the use of a means for accelerating the shutter blade to a speed substantially greater than the necessary speed to attain the shortest exposure interval, the acceleration being completed within the "time-to-open" interval and the electromagnetic control then being used to reduce the comparatively high speed to the speed level for attaining the desired exposure time interval. Thus, for the longest exposure intervals, for instance, one-quarter second, the "time-to-open" interval will be of the same order of magnitude, i.e., not substantially longer than one-quarter second.

Figure 2:
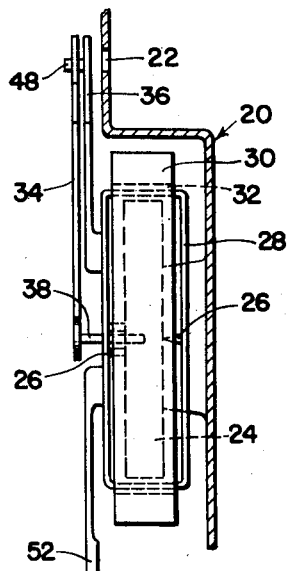
FIG. 2 is a cross-section taken along the line 2—2 of FIGURE 1.
Figure 3:
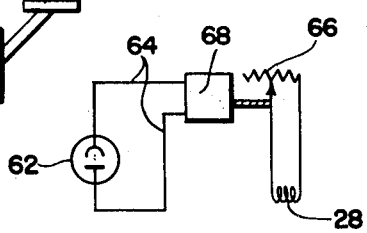
FIG. 3 is a schematic view of a circuit employable with the mechanism of FIGURE 1.

Shutter mechanisms having an electromagnetic shutter speed control means may be in a variety of forms. Referring now to the drawings, wherein like numerals denote like parts, one form of the invention is shown in FIGS. 1 through 3, wherein the elements of the invention are shown schematically. In FIG. 2 there is shown a housing means generally indicated at 20 and in which is disposed an exposure aperture 22. Mounted on housing 20 adjacent aperture 22 is an electromagnetic exposure control means which comprises a magnetic element such as a permanent magnet 24, the magnetic element being characterized in that a magnetic field may be associated therewith. In the preferred embodiment this magnetic field is substantially stable in direction and intensity and will be henceforth referred to as the permanent field. Permanent magnet 24 comprises, for example, an approximately cylindrical bipolar element with perpendicularly truncate ends, the poles being designated arbitrarily at "N" and "S" and the magnetic lines of flux of the permanent field being substantially perpendicular to the faces of the designated poles. Permanent magnet 24 may be composed of any of the permanently magnetized ferromagnetic alloys, as for example, "Alnico VI" having a large coercive force of, for instance, 600 oersteds for flux densities less than 6,000 gauss. Longitudinally engirdling magnet 24 and pivotally mounted at the truncate ends of magnet 24 by suitable mounting means such as pivots 26 is an electrically conducting member such as coil 28 which is adapted for rotation in a plane normal to the longitudinal axis of and about the approximately circular periphery of magnet 24. Coil 28 is preferably composed of a metal such as copper or aluminum and has at least one complete turn of approximately 360°. The coil may assume a variety of shapes, preferably being adapted to match the configuration of magnet 24. The longitudinal axis of magnet 24 is preferably substantially equal to its own cylindrical diameter in order that the greater bulk of coil 28 be so disposed within the permanent field of magnet 24 as to be rotatable about pivots 26 substantially perpendicularly to the magnetic flux of the permanent field. As a means for conducting and intensifying the flux of the permanent field, there is provided a means such as ring 30 which is mounted on housing 20 and so disposed peripherally about the approximate circular configuration of magnet 24 that coil 28 is freely rotatable between said ring and said magnet. It is preferred that ring 30 be disposed with the closest possible tolerance to magnet 24 commensurate with the free rotatability of coil 28 inasmuch as the intensity of the magnetic field in gap 32, provided by the separation of ring 30 and magnet 24, is an inverse function of said separation. Ring 30 may be composed of any of the ferromagnetic metals or alloys, for example soft iron, in which a magnetic flux path may be established and which exhibits high permeability, as for instance, in excess of 1,000 c.g.s. units, and high saturation value, for example, in excess of 10,000 gauss. For shielding gap 32 from stray magnetic fields and for providing uniformity of the permanent magnetic field in the vicinity of coil 28, the longitudinal length of ring 30 may be so constructed as to be equal to or slightly greater than the width of permanent magnet 24. However, weight considerations comprise an important element in determining flux ring dimensions and would therefore require the smallest flux ring commensurate with proper function.

As a means for covering and uncovering exposure aperture 22 there is provided a shutter element which, in the embodiment shown in FIGS. 1 and 2, comprises a double member such as independent blade 34 and controlled blade 36. Independent blade 34, in the form shown, comprises a longitudinal member pivotally mounted at one end thereof upon magnet 24 by suitable bearing means such as pivot 38, pivot 38 being, in the form shown, disposed coaxially with the pivotal axis of movable coil 28. Independent blade 34 includes a planar covering portion 40, covering portion 40 being disposed in a normally covering relation to aperture 22 and being adapted for rotation in a plane perpendicular to the optic axis of aperture 22 between a first or rest position wherein covering portion 40 completely covers aperture 22 and a second or displaced position wherein covering portion 40 completely uncovers aperture 22. Independent blade 34 may also include means for counterweighing covering portion 40, if desired.

Controlled blade 36 comprises a longitudinal member, one end of which is preferably so rigidly attached to coil 28 as to be movable therewith for rotation in the same plane as independent blade 34. Disposed at the opposite end of controlled blade 36 is planar portion 42 which is preferably adapted for movement in a plane parallel to and closely adjacent the plane of movement of covering portion 40 of independent blade 34 and is movable between a rest position wherein it lies to one side of aperture 22 and a covering position wherein it completely covers said aperture. Planar portion 42 is so shaped as to be substantially greater in all dimensions than the cross-sectional area of aperture 22 and has a greater dimension disposed tangent to its arc locus of rotation. Edge 44 of planar portion 42 is provided therein with an opening such as slot 46 which is so disposed as to overlie aperture 22 during a portion of its movement from rest position to covering position and is so dimensioned as to provide a minimum opening in the double member for controlling exposures through aperture 22. Extending perpendicularly from edge 44 of planar portion 42 and so disposed in the arcuate path of rotation of independent blade 34 that said blades cannot completely overlie one another, is a means, such as tab 48, for imparting rotational movement to independent blade. Independent blade 34 and controlled blade 36 when in their rest positions are so disposed relative to one another that when independent blade 34 is in the first position, covering portion 40 of independent blade 34 abuts tab 48. Tab 48 is preferably so disposed on planar portion 42 that when covering portion 40 of independent blade 34 abuts tab 48, abutting edge 49 of covering portion 40 so overlaps edge 44 of planar portion 42 as to provide a lighttight seal without covering slot 46.

As a means for coupling independent blade 34 with controlled blade 36 and as a means for releasably and resiliently retaining said blades in abutting position, there is provided a means such as torsion spring 50 which is shown anchored at its extremities, respectively, at the independent blade and the controlled blade. Other means for retaining said blades in abutment may be provided such as a hairspring mounted at pivot 38 and so disposed as to urge independent blade into abutment with tab 48, or in the form of a torsion spring similar to spring 50 but anchored instead to controlled blade 36 and housing 20. In order to insure a ready angular separability between blade 34 and blade 36, the means for releasably retaining said blades in abutment should exert a force which is considerably weaker than the force employed in rotating the independent blade from the first position to the second position. Additionally, in order that the force of the releasable retaining means be exerted substantially equally upon the blades, the inertia of the independent blade should preferably be matched with the inertia of the controlled blade.

For rotating coil 28 about its pivotal axis, there is provided a means such as arm 52 which is preferably rigidly attached to coil 28 and extends therefrom oppositely to and preferably in the plane of rotation of independent blade 34. As a means for imparting an accelerating force for rotating coil 28 and associated controlled blade 36 as well as independent blade 34 there are provided means which may be of the general type described in U.S. Patent No. 2,531,936, which patent discloses a means for imparting an aperture-uncovering movement to a shutter blade of the "free moving" type, by use of a striking member which delivers an impact under the bias of a driving spring. As so described, such a means for imparting an aperture-uncovering movement is preferably utilized with the mechanism herein disclosed, such means being designated generally at 54. Shown extended from said means is a rotatable impulse member 56 which is so disposed relative to arm 52 as to impart a rotational movement to said arm when the impulse member is rotated under the bias of a resilient means such as spring 58. For actuating means 54, there is shown an actuating arm 60 extending therefrom, arm 60 being adapted for manual manipulation by an operator to effect actuation. It is, of course, desirable that the force imparted by impulse member 56 to arm 52 be greatly in excess of the force exerted by linear spring 50.

As a means for variably adjusting the controlling force of the electromagnetic means heretofore described, there may be used, to complete a circuit between the terminals of coil 28, a variable electrical impedance, the magnitude of which may be manually determined by an operator of the mechanism. However, it is preferred that the means for adjusting the controlling force be automatically responsive to the luminous intensity of the field of view of a photographic device embodying the invention. Consequently, in FIG. 3 there is shown a diagram of one form of a circuit which comprises a photoelectric cell 62 preferably of the photovoltaic variety, which cell produces electrical signals in proportion to the intensity of light incident thereon. Leads 64 are provided for introducing said signals into a means for variably adjusting an electrical impedance, such as resistor 66, responsively to said signals, which variable impedance adjusting means is designated generally at 68 and which may comprise any of the several devices of this kind known to the art. Moving coil 28 is preferably electrically coupled in series with resistor 66.

Before describing other embodiments of this invention, a brief discussion of the operation of the mechanism shown and heretofore described will be helpful.

Actuation by an operator of the means 54 for imparting an aperture-uncovering movement releases impulse member 56 which strikes arm 52 thereby accelerating arm 52 and attached coil 28 for rotation in a clockwise direction. The rotation of coil 28 so moves longitudinal portions thereof perpendicularly to the magnetic flux of magnet 24 as to induce a current in the coil, the direction of the current being such that the force of the induced magnetic field associated with the induced current is opposite in direction to the "permanent" field of magnet 24. The magnitude of the induced field is determined by such factors as the intensity of the "permanent" field, the electrical resistance of coil 28 and the speed of movement of coil 28 relative to magnet 24.

The rotational movement of coil 28 and consequently of controlled blade 36 is transmitted to independent blade 34 through tab 48, both blades thereby rotating in a clockwise direction from rest position. The speed of rotation of independent blade 34 is determined primarily by the accelerating force thus imparted, the inertial mass of the independent blade and the frictional characteristics of pivot 38. The speed of rotation of controlled blade 36 is determined by similar factors but also includes the countereffect of the induced field interacting with the permanent field, i.e., the product of the magnitudes of the two fields, as well as the force exerted by spring 50 acting counter to the retarding effect of the coupled fields. Spring 50 also functions in maintaining the blades in abutment with one another when in rest position or during movement of the blades in the event of a zero induced field.

The countereffect of the induced field acts, in this embodiment, as a brake upon the movement of controlled blade 36 and hence causes the controlled blade to lag behind the independent blade. The angular separation of the blades occasioned by the lag of the controlled blade is thus a function of the intensity of the induced field. It should be noted that a short circuit of the terminals of coil 28 results in a maximum current flowing during movement of the coil, hence a maximum induced field. On the other hand, introducing into the circuit of the coil, for example, an essentially infinite resistance, creates an effectively open circuit and results in essentially no current flowing during movement of the coil, the field induced thereby being a minimum or zero. These two states then represent the limits of induced field intensity as controlled by the introduction of variable impedance 66 in circuit.

Light, incident upon photocell 62, causes the production of signals proportionate thereto, the signals then actuating the variable impedance control 68 for accordingly varying the impedance 66 introduced into the coil circuit and for controlling the speed of movement of controlled blade 36. As the speeds of movement of the blades of the shutter element across aperture 22 establish exposure time therethrough and determine the angular separation between the blades, the exposure interval is therefore a function of the angular separation and hence a function of the intensity of light incident upon photocell 62.

It being desirable that the controlling effect of the electromagnetic means occur during movement of the portions of coil 28 in those portions of gap 32 wherein permanent magnetic field intensity is at a maximum, it should be noted that the braking effect produced by the electromagnetic means may be relatively minimal at the beginning of the movement of coil 28 from the rest position. Consequently, the accelerating force imparted by impulse member 56 will readily accelerate coil 28 and associated blades 34 and 36 to a compartively high speed within a short time interval and preferably before independent blade 34 uncovers aperture 22. At a predetermined position before the independent blade uncovers aperture 22, the position of coil 28 is such that the braking effect of the electromagnetic means is at a maximum for the desired exposure and hence reduces the speed of controlled blade 36 to the desired level. The same acceleration and same maximum velocity may be utilized with a variable braking effect to obtain a wide range of shutter speeds while yet maintaining a comparatively constant "time-to-open" interval.

Figure 6:
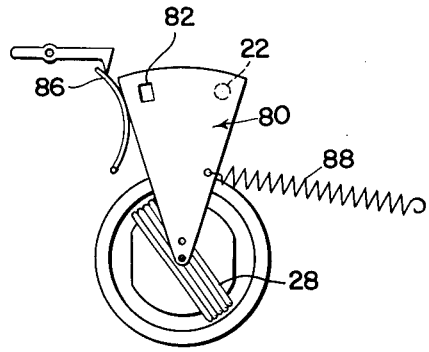
FIG. 6 is a schematic plan view of an embodiment of the invention employing an accelerating spring.
Figure 7:
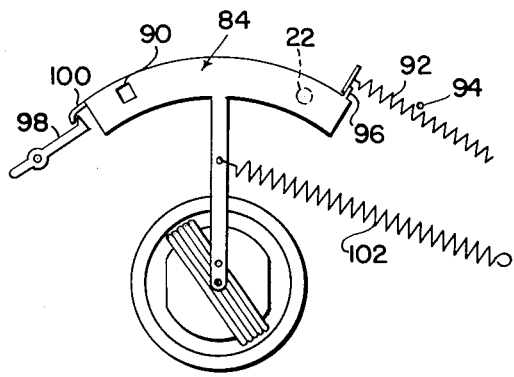
FIG. 7 is a schematic plan view of another embodiment employing an accelerating spring.

In the embodiments shown in FIGS. 6 and 7, there are disclosed mechanisms in which the electromagnetic elements are similar to the embodiment heretofore described. The housing means in which the mechanisms are enclosed are not shown except for the exposure aperture 22 therein. In FIG. 6, as a means for covering and uncovering aperture 22 there is provided a shutter element which comprises a unitary planar blade 80 having an opening 82 therein. Blade 80 is mounted on coil 28 (the coil comprising one element of an electromagnetic means as heretofore disclosed) for movement with the coil between a rest position wherein opening 82 is to one side of aperture 22 and a displaced position wherein opening 82 is to an opposite side of the aperture, opening 82 being adapted to overlie aperture 22 during the movement of the blade between rest and displaced position. It should be noted that the embodiment shown in FIG. 7 includes a substantially similar blade 84, having an opening 90 therein, the difference in shape being a matter of choice. Blade 84 is mounted and movable with respect to aperture 22 in a like manner to blade 82 of FIG. 6 with, however, the following differences:

As a means for accelerating blade 80 of FIG. 6 there is disposed, adjacent the blade, a resilient means such as cantilever leaf spring 86 which is so disposed, when blade 80 is in the rest position, as to abut blade 80 and be under stress. Attached to the shutter blade and to the housing is a second resilient means such as torsion spring 88 for exerting a substantially constant force upon blade 80 and as a means for moving blade 80 from the rest position to the displaced position. It should be noted that torsion spring 88 biases blade 80 in approximately the same direction as the bias imposed by leaf spring 86.

In the embodiment shown in FIG. 7, as a means for accelerating blade 84, there is provided a torsion spring 92 having a predetermined linear movement and being capable of acting upon blade 84 during only a portion of the movement of blade 84 from rest to displaced position. Spring 92 is releasably engaged at one of its extremities to blade 84 and anchored at the other extremity to the housing means, a spring stop 94 being mounted on the housing means adjacent spring 92 to provide a means for limiting the linear movement of the spring. A suitable means, such as tab 96, for engaging and disengaging blade 84 from the accelerating spring is provided. As a means for releasably retaining the shutter blade in a set position, there is provided a detent means, such as rotatable catch 98 which is engageable upon a portion of the shutter blade, such as hook 100. Coupling shutter blade 84 with the housing is a resilient means, for instance, torsion spring 102, for moving the blade from rest to displaced position under an approximately constant bias.

In operation, both of the embodiments described and shown in FIGS. 6 and 7 operate in a similar manner to the embodiment heretofore described. However, the exposure time is not a function of the angular separation of two members, but is instead a function of the speed of movement of the opening in the respective blade across aperture 22 during that portion of the movement of the blade from rest to displaced position during which the opening overlies aperture 22. It should be noted that the operation of the unitary blade embodiments involves an initial high blade velocity and a subsequent variable reduction of such high velocity of the blade by an electromagnetic means to obtain a predetermined and desired exposure.

Figure 8:
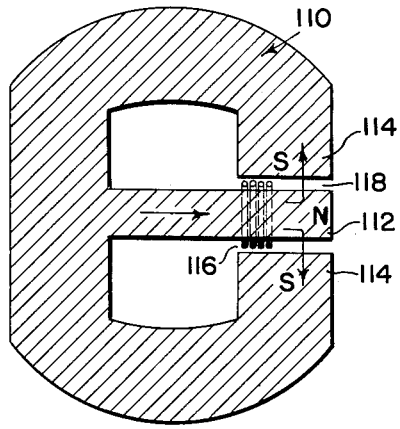
FIG. 8 is a schematic cross-section of one form of a magnetic element of the invention.

In FIG. 8 is shown a magnetic element in an alternative embodiment of an electromagnetic control means. The magnetic elements shown in cross section comprises a permanent magnet 110 in which one pole 112 is disposed concentrically with respect to the other pole 114. The direction of the lines of magnetic flux are as indicated by the arrows. Cooperating with magnet 110 is a coil 116 disposed for axial movement along the periphery of the internal pole 112 in the gap 118 provided by the spacing of external pole 114 from internal pole 112. This embodiment provides the advantage of confining the entire magnetic flux within the magnet, dispenses with a flux conducting means such as a ring and is readily adaptable for use with shutter blades which are adapted for translatory motion as opposed to the pivotal type of shutter blade described herein. As a practical matter, it might prove inefficient to use such a magnet. In such event, internal pole 112 in its entirety might comprise a single magnet, the remainder of the element then constituting a flux conducting member without materially altering the operation of the mechanism.

Figure 10:
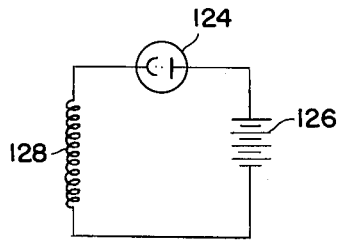
FIG. 10 is a schematic view of another alternative form of such an electrical circuit.
Figure 9:
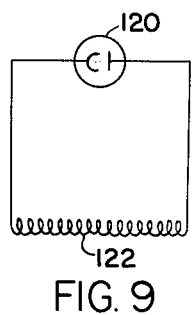
FIG. 9 is a schematic view of an alternative form of an electrical circuit for use with embodiments of the invention.

In FIGS. 9 through 10 are shown alternative embodiments of the circuit of the mechanism heretofore disclosed, which circuit comprises a movable coil and a photosensitive means. In FIG. 9 is shown a photosensitive means such as photovoltaic cell 120 which is so coupled with movable coil 122 that the output of cell 120 is of opposite polarity to the current induced in movable coil 122. With suitable magnitudes of photocell current and induced current, the retarding force which is due to the induced current may be modified in accordance with variations in photocell current due to changes in light intensity incident upon the photocell. In FIG. 10 is shown another form of the circuit wherein the photosensitive means comprises a photoconductive cell 124, for controlling the current supplied by an electric power source such as battery 126, battery 126 being so introduced into the circuit that the controlled current is opposite in polarity to and smaller in magnitude than the maximum current inducible in movable coil 128.

In the embodiments of the invention previously described herein, the electromagnetic control means has been shown for controlling the speed of movement of a shutter element by the braking or retarding effect of magnetic field interaction, the electromagnetic means being used, in a sense, as a generator. The electromagnetic means may also be employed as a "motor" means for moving the shutter element at variable speeds.

Such a "motor" is disclosed in the embodiment of FIG. 4 and comprises such elements as independent blade 130, controlled blade 132, magnet 134, flux ring 136, spring 138, and first coil 140 to which is attached controlled blade 132, the construction of these elements being substantially similar to their counterparts as described in detail in connection with FIG. 1. It may be seen that in FIG. 4 independent blade 130 is mounted upon an electrically conducting member, such as second coil 142, which is preferably mounted coaxially with first coil 140 for pivotal movement about magnet 134, independently of first coil 140, within the gap 144 provided by the separation of magnet 134 and ring 136. As a means for moving independent blade 130, there is provided a resilient element such as spring 146, the extremities of which are, respectively, anchored to a portion of independent blade 130 and to the housing (not shown). In distinction to the embodiments shown in FIGS. 1 and 2, the independent blade 130 preferably has a mass greatly in excess of the mass of controlled blade 132. Consequently, spring 146 need provide a spring force of sufficient magnitude to move the combined masses of the independent blade 130 and second coil 142 against any possible retarding effect created by the coupling of the permanent field of magnet 134 with any induced field in second coil 142. Spring 138, which is shown connecting independent blade 130 and controlled blade 132, possesses only enough resiliency to maintain the two blades in abutment when in rest position and essentially serves the same purpose as its counterpart spring 50 shown in FIG. 1.

Figure 4:
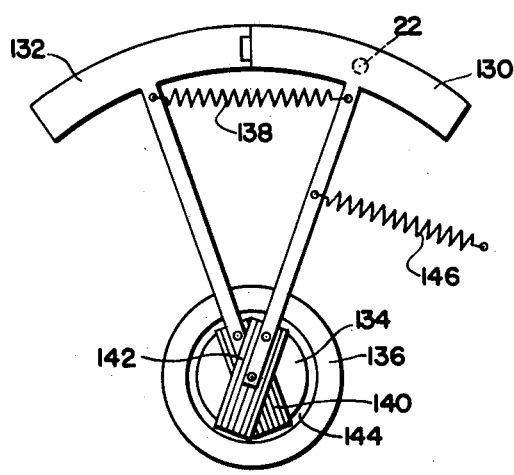
FIG. 4 is a schematic plan view of another embodiment of the invention.
Figure 5:
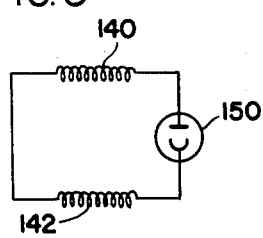
FIG. 5 is a schematic view of a circuit employable with the mechanism of FIG. 4.

In FIG. 5 is shown an electrical circuit which may comprise part of the mechanism of FIG. 4 and includes a photosensitive means such as a photoconductive cell 150 which is preferably disposed in series with first coil 140 and second coil 142. In operation, movement of independent blade 130 under the bias of spring 146 rotates second coil 142 in the gap 144 between ring 136 and magnet 134, thereby inducing a current in the second coil. The current so induced is modified by the action of photoconductive cell 150 which acts as a resistance means, the magnitude of which is an inverse function of the intensity of light incident thereon. The modified current from second coil 142 is then introduced into first coil 140 to induce a transient field therein for interacting with the permanent field of magnet 134 to rotate controlled blade 132 about its pivotal axis. At minimum light intensity incident on photocell 150, the motive current supplied to first coil 140 is also minimal, hence the rotation of controlled blade 132 will lag substantially behind the rotation of independent blade 130. At high light intensity, the motive current supplied will rotate first coil 140 at a susbtantially higher speed, hence decreasing the lag or angular separation between the blades. As the exposure time through aperture 22 is a function of the angular separation between the blades, the exposure times are variable in accordance with the intensity of light.

Numerous modifications of the latter embodiment may be made; for instance, individual magnets and corresponding flux conduction and intensification means may be provided for each of the coils attached to the respective blades. Additionally, independent blade 130 need not be mounted upon a rotating coil, but may be simply pivoted upon bearing means as described in connection with FIG. 1, and a separate source of motive power, such as a generator or battery, may be introduced into the circuit in place of second coil 142 with an appropriate switching means for actuating the power source synchronously with the actuation of other elements of the shutter mechanism. In the latter event, the mechanism may be modified in other embodiments in that the double member shutter element may be replaced with a shutter element comprising a unitary blade having an opening therein as in FIGS. 6 and 7.

Figure 14:
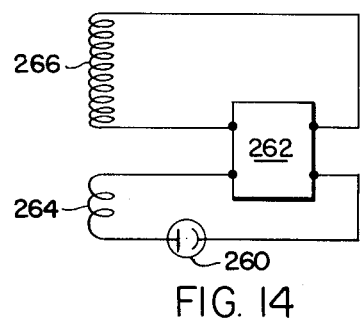
FIG. 14 is a schematic view of an alternative electrical circuit.

A particularly desirable form of circuit for adjusting the controlling force responsively to the luminous intensity of the field of view of a photographic device may be seen in FIG. 14. This circuit, with appropriate choice of values for the various elements thereof, may readily be adapted for use with those embodiments of the electromagnetic means, in the form of either "motors" or "brakes," heretofore described, wherein a force acts upon the controlled element throughout an exposure movement. The circuit employs the principle of electrical feedback and, therefore, has the advantages of being self-adjusting, simple, and, by compensating automatically for inexact clearances between the permanent magnet and the flux conducting means, allows more flexible standards in manufacturing tolerances.

As shown in FIG. 14, the circuit comprises a photosensitive means such as photovoltaic cell 260, and an auxiliary conducting member such as auxiliary coil 264 coupled in series with electronic switching means, such as transistor 262. The transistor 262 is also electrically coupled with movable main coil 266. Auxiliary coil 264 preferably comprises a coil of substantially smaller dimensions and values than the movable main coil and is movable with the main coil through the same permanent magnetic field.

In operation, movement of auxiliary coil 264 and main coil 266 through the permanent magnetic field induces voltages in the coils, the magnitude of the voltages depending upon the speed of movement of the coil relative to the field, as well as upon other factors such as the strength of field. Photovoltaic cell 260, when exposed to light of a predetermined intensity, generates a voltage which is roughly proportional to said intensity. The auxiliary coil 264 and photocell 260 are so disposed that the voltage in coil 264 and the voltage of the cell are opposed to or buck one another, the resultant voltage being applied to transistor 262. Transistor 262, being an electronic switch, is characterized in that the resistance of the transistor is a function of the applied voltage, the resistance being and remaining at a maximum value while the applied voltage is below a predetermined minimum. When the applied voltage exceeds said predetermined minimum, the resistance of the transistor decreases abruptly to a minimal value.

Where the applied voltage, which is the algebraic sum of the photocell voltage and the auxiliary coil voltage, remains below the predetermined minimum, main coil 266 is essentially in open circuit, the resistance of the transistor being at a maximum and the damping effect (assuming the main coil to be utilized as a "brake") is at a minimum. When the voltage applied to the transistor exceeds the predetermined minimum, the transistor then presents a minimum resistance such that main coil 266 is essentially short circuited and the controlling or damping effect of the electromagnetic means is at a maximum.

Inasmuch as the voltage applied to the transistor is dependent upon two variable voltages, i.e., the photocell voltage and the auxiliary coil voltage, then either a full or substantially no damping force is applied by main coil 266 according to whether the signal voltage of auxiliary coil 264 indicates that the speed of movement of the coils is faster or slower than the signals from photocell 260 indicate that it should be. Consequently, the full damping force of the electromagnetic means is available when needed and also is available to counteract any magnetic forces due to inexact clearances between the permanent magnet and the flux conducting means.

Figure 15:
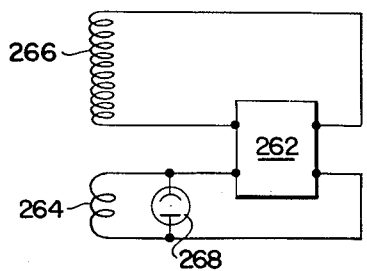
FIG. 15 is a schematic view of yet another alternative circuit.

It should be noted that the circuit shown in FIG. 14 may be modified, the modification being shown in FIG. 15 wherein the photocell comprises a photoconductive element 268 in combination with elements similar to those shown in FIG. 14. It should be noted that the photocell is placed in parallel with the auxiliary winding rather than in series as shown in FIG. 14. The operation of the overall circuit in FIG. 15 is to decrease the resistance across the main coil 266 when the resistance across photoconductive cell 268 increase and vice versa, thus providing a control similar in operation to that described in connection with FIG. 14.

Figure 16:
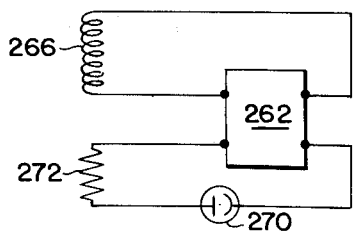
FIG. 16 is a schematic view of still another alternative embodiment of a circuit.

Yet another control circuit is shown in FIG. 16 which employs a feedback principle. The circuit of FIG. 16 comprises a high impedance network and a low impedance network, the former including photoconductive cell 270 coupled in series with an electrical impedance such as ballast resistor 272, both cell 270 and resistor 272 being in series with an electronic switching means such as transistor 262. The low impedance network comprises the transistor and coil 266 in series with one another. In operation, the voltage induced in coil 266 by virtue of its movement through a magnetic field (or by the movement of the field if the coil is to be static) is modified or varied by the high impedance network, the voltage applied to transistor 262 by the high impedance network being a function of both the ballast resistance and photocell resistance as varied by the intensity of light incident thereon. When the applied voltage exceeds a predetermined minimum, the impedance of transistor 262 drops abruptly, essentially short circuiting coil 266 and creating a maximum damping effect. This embodiment has the distinct advantage of employing the coil voltage as its controlling parameter, thus avoiding the use of any sensing or auxiliary coil.

It should be noted that in FIGS. 14, 15 and 16, the circuits may be modified to obtain a desired operation by adding various electrical impedances for matching the circuit to the preferred characteristics of main coil 266 or to match the output characteristics of the photocell employed. Additionally, as other examples of an electronic switching means, there may be employed such devices as a thyratron tube or a solenoid with appropriate power sources, although the transistor is preferred, particularly in view of its compactness and light weight.

Figure 11:
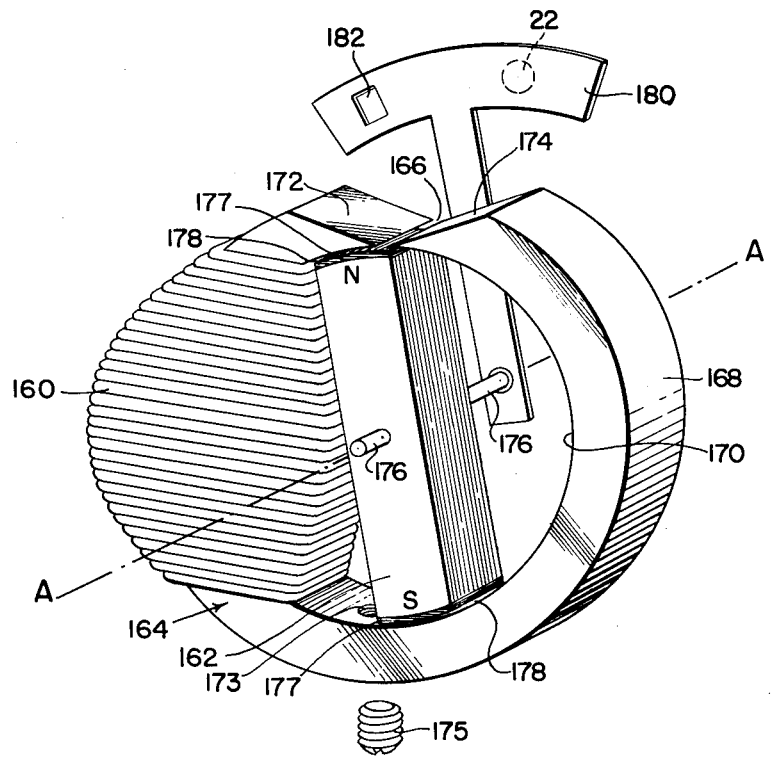
FIG. 11 is a perspective schematic view of another embodiment of the invention.

In yet another embodiment of this invention, the electromagnetic means comprises an electrodynamic device such as is shown in FIG. 11, which device is characterized by having a static member which preferably comprises a conducting member, and by having a moving member which preferably comprises a magnetic element in distinction to the embodiments previously disclosed wherein the coil comprises the moving member and the magnet, the static member. In the preferable form, the electrodynamic device utilizes a permanent magnet as a polarizing armature which is rotatable through an angle less than 180 degrees. Such a device may be termed a permanent magnet torque dynamo.

The conducting member, in the form shown, comprises coil 160 which is wound around a magnetizable core such as ring 164. Ring 164 is shown as a generally cylindrical element having a longitudinal slot 166 disposed therein parallel with the longitudinal axis A—A of ring 164. Slot 166 preferably extends completely through the ring from the external periphery 168 to the internal periphery 170 thereof, thereby creating a discontinuity in the arcuate configuration of ring 164. Edges 172 and 174 of slot 166 are so beveled that slot 166 is wider at the external periphery 168 of ring 164 than at the internal periphery 170 thereof. Ring 164 is preferably constructed of a suitable ferromagnetic substance, such as soft iron or "72 transformer iron," either solid or in laminated form, which is characterized by having a permeability of, for instance, 7,000 c.g.s. units, a high saturation level of about 20,000 gauss, and a minimum eddy current loss. As a means for controlling the reluctance of ring 164, there is provided an element, such as adjusting screw 175, which is movable normally to the cylindrical axis A—A of the ring for increasing or decreasing the cross-sectional area of ring 164, for instance, in and out of threaded hole 173.

The magnet member, such as magnet 162, preferably comprises a permanent magnet composed of an alloy such as "Alnico V" having a high energy product, preferably at least as great as $4.5 \times 10^6$ ergs per cubic centimeter and is preferably in the form of a longitudinal member having magnetic poles disposed at the extremities thereof, the poles being arbitrarily noted in the drawing as "N" and "S." As a means for maintaining the stability of the coercive force of magnet 162, the extreme pole portions of the magnet preferably comprise integral elements such as caps 177 which are, for instance, comprised of a substance exhibiting minimal magnetic retentivity and high permeability such as soft iron. Magnet 162 is so mounted on suitable means such as pivot 176 with the longitudinal axis of magnet 162 disposed perpendicularly to the longitudinal axis A—A of ring 164 at a point approximately midway between the poles for pivotal movement inside the internal periphery 170 of ring 164 that the pivotal axis of magnet 162 is preferably coaxial with the longitudinal axis A—A of ring 164. In order to maintain the highest feasible flux density in the device, magnet 162 is so dimensioned that the poles thereof are disposed as closely adjacent the internal periphery of ring 164 as may be commensurate with free rotatability of the magnet, thus establishing a minimum dielectric space or gap 178 between each pole and the internal periphery 170 adjacent thereto. Magnet 162 is normally located in a rest position wherein one of said poles is disposed adjacent and to one side of slot 166. Magnet 162 is rotatable about its pivotal axis between said rest position and a displaced position wherein said pole is located adjacent and to the opposite side of slot 166, the arc of rotation of magnet 162, in this embodiment, being preferably limited to substantially less than 180 degrees.

As magnet 162 is thus movable in a limited arc across slot 166 between the rest position and the displaced position, there are at least two substantial segments of space within the region defined by the internal periphery 170 of ring 164 into which space coil 160 may be packed without interfering with the movement of magnet 162. Coil 160 therefore comprises at least two sections, only one of which is shown in its entirety, which are wound about ring 164 to occupy the space segments through which magnet 162 is not movable. Coil 160 is preferably constructed of a high conductivity, low resistance metal such as copper. The two sections of coil 160 are preferably connected in series to one another.

Attached to pivot 176 of magnet 162 and extending perpendicularly therefrom is a means for covering and uncovering an exposure aperture, such as shutter blade 180 which, in the form shown, comprises a unitary blade having an opening 182 therein. Blade 180 is so disposed relative to exposure aperture 22 that opening 182 is movable completely across aperture 22 with movement of magnet 162 between the rest position and the displaced position.

In operation, the embodiment shown in FIG. 11 may be employed either as a motor means for moving shutter blade 180 at variable speed across aperture 22 or as a brake means for retarding the speed of movement of shutter blade 180 across the aperture. When employed as a means for moving the shutter blade, the electromagnetic means is, of course, utilized in a circuit such as is shown in FIG. 10 wherein an electrical source supplies motive power to coil 160. The introduction of electrical power into coil 160 induces a transient field in ring 164 and the interaction of the transient field with the permanent field of magnet 162 moves magnet 162 from one side of slot 166 to the other side of the slot, thereby moving the shutter blade across aperture 22. Inasmuch as magnet 162 is movable in a limited arc which need be traversed only within a maximum time interval determined by the desired slowest exposure, the electrical power may be supplied to coil 160 from means such as a condenser instead of a battery. In the latter event, the condenser charge may be predetermined as a function of light incident upon a photosensitive means.

Where the electromagnetic means of FIG. 11 is to be employed as a means for retarding the speed of movement of shutter blade 180, a means for moving the shutter blade, such as a spring attached thereto, may be employed. In such case the release of shutter blade 180 for movement across aperture 22 under the bias of the spring induces a current in coil 160 through the abrupt change or switching of the magnetic flux as a pole of magnet 162 traverses slot 166, thereby causing a transient field to be associated with coil 160, the transient field opposing the permanent field of magnet 162. The magnitude of the transient field may be controlled as with circuits similar to those disclosed previously in FIGS. 9 and 10, thus making the retarding effect a function of the intensity of light incident upon a photosensitive means.

The device of FIG. 11, as shown and described, has the advantage of being compact, and exhibits good linearity and high speed of response as well as a very desirable damping force to weight ratio. Additionally, by employing a magnet as the moving member or armature, the air gap 178 between the magnet and ring may be used solely for mechanical clearance whereas, with a moving coil, the gap must be dimensioned to include the coil. As the induction of the device is an inverse function of the displacement of the magnet from the ring, the efficiency is improved markedly in that the ratio of damping force to the inertia of the movable shutter part is superior to a moving coil device. Also, the moving magnet requires no sliding contacts or flexible leads.

Thus far, the disclosed embodiments of this invention have, in effect, coupled only exposure duration with a photosensitive means. Certain problems arise out of controlling only exposure duration. For instance, in the event that a fixed focus camera is to be used in connection with these embodiments, and the lens opening of such camera is in the nature of f/70, the longest exposure time in a range of available exposure durations may prove to be too long. Another problem lies in the difficulty of obtaining a very large range of exposure valves.

It is apparent that all of these embodiments have, in common, long exposures that do not have a lesser "time-to-open" interval than the short exposures. Hence, in yet other forms of this invention it is possible to use a changing effective exposure aperture which increases, independently of the signals from the photocell, as the exposure time increases, thereby increasing the range of exposures available while yet retaining a minimum exposure aperture.

Figure 12:
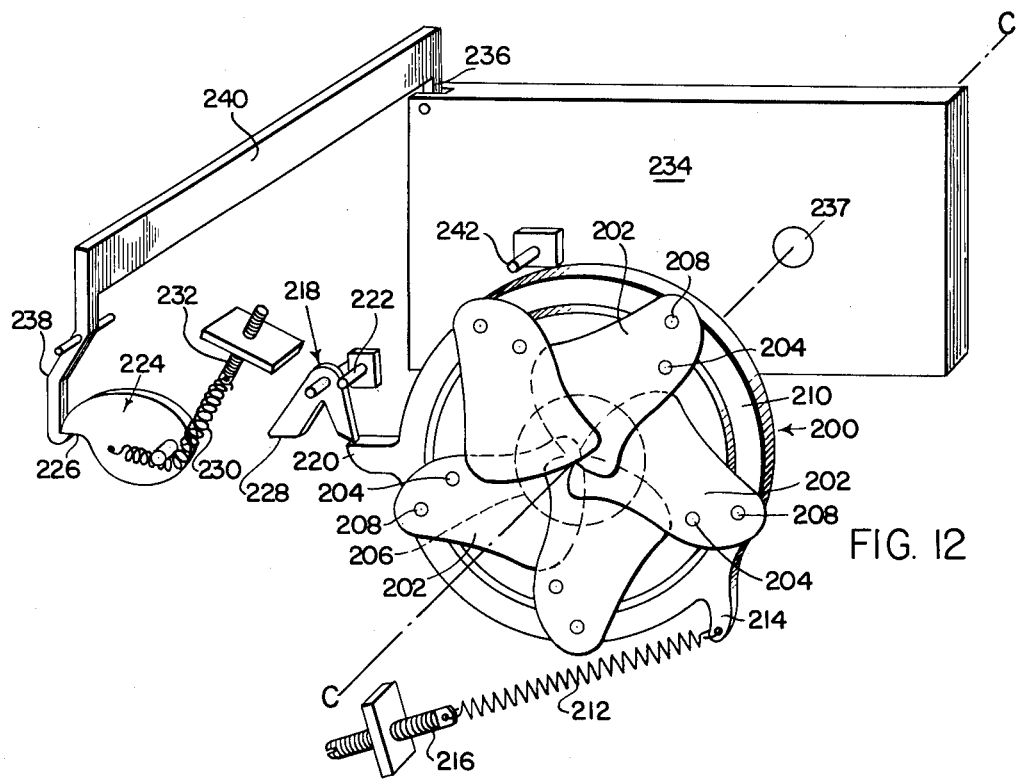
FIG. 12 is a perspective schematic view showing another form of the invention.

In FIG. 12 may be seen an embodiment of this modification wherein a shutter mechanism, as for instance that shown in FIG. 1, is associated with an aperture control means such as iris mechansm 200 and with means for synchronously actuating the shutter mechanism and the iris mechanism. Inasmuch as the aperture control means preferably presents a continously increasing effective aperture area, thus comprising a "dynamic diaphragm" as contrasted with those iris diaphragms in which the apertures area remains constant during a given exposure, the aperture control means in the form shown may comprise one of the many symmetrically opening shutter mechanisms, particularly those of the iris type well known in the art. In FIG. 12 is shown a schematic diagram of such a "dynamic diaphragm" comprising a plurality of covering members such as blades 202 which are pivotally mounted by means such as pivots 204 and disposed radially about an exposure aperture 206 in a covering relation thereto when in a normal or rest position. Blades 202 are also mounted by suitable means, such as pivots 208, upon a moving member, such as drive ring 210, which is disposed concentrically with respect to aperture 206, drive ring 210 being so rotatable about aperture 206 as to pivot blades 202 from a rest position to an uncovering position with respect to the exposure aperture. As a means for so rotating drive ring 210 there is provided a resilient element, such as spring 212, which is anchored at its extremities, respectively, to stud 214 on drive ring 210 to a means such as adjusting screw 216 for adjusting the tension of spring 212. It is to be understood that the elements thus far described are all shown in a set or tensioned position.

As a means for releasably retaining the elements of the mechanism in a tensioned position, there is provided, a rotatable first latch element 218 which is pivotally mounted adjacent ring 210 and, when the elements are in tensioned position, is in releasable engagement with arm 220 which extends radially from ring 210. Disposed adjacent first latch element 218 is a means, such as stop pin 222, for limiting the rotation of the first latch element.

As a means for releasing first latch element 218 from arm 220 at a predetermined time interval after actuation of the mechanism there is provided a timing device, such as flywheel 224, which comprises a member having a striking surface 226 and being pivotally mounted for rotational movement. Flywheel 224 is so disposed that a portion of first latch element 218, such as impact surface 228, is in the arcuate path of rotation of striking surface 226 of flywheel 224. As a means for imparting a rotational movement to flywheel 224 there is provided a resilient element, for example spring 230, which is anchored at its extremities, respectively, to a portion of flywheel 224 and to second adjusting screw 232, the latter providing a means for adjusting the tension of spring 230 and hence the timing of the rotation of flywheel 224.

Associated with iris mechanism 200 is a shutter mechanism, such for instance as that shown in FIG. 1, and which is designated generally in the drawing of FIG. 12 as 234. Shown extending from shutter mechanism 234 is an actuating means such as arm 236 for actuating the shutter blade of shutter mechanism 234. Shutter mechanism 234 is provided with an exposure aperture schematically indicated at 237, shutter mechanism 234 being so disposed that aperture 237 and aperture 206 of iris mechanism 200 are preferably optically coaxial, the common axis being designated at C—C.

As a means for releasably retaining flywheel 224 from rotation under the bias imposed by spring 230, there is provided a rotatable second latch element 238 which is normally in releasable engagement with striking surface 226 of flywheel 224. For simultaneously actuating shutter mechanism 234 and flywheel 224 there is provided a manually operable means, such as pressure bar 240, which is shown, for instance, as being integrally attached to both arm 236 of shutter mechanism 234 and second latch element 238. Shutter mechanism 234 has an exposure aperture 242 and is preferably so disposed relative to iris mechanism 200 that the optic axes C—C of apertures 242 and 206 are colinear.

In operation, pressure applied by an operator upon pressure bar 240 so rotates arm 236 and second latch 238 as to simultaneously release the shutter blade of the shutter mechanism 234 and to release flywheel 224 for rotation under the urging of spring 230. As the shutter blade of the shutter mechanism moves between its rest position and the position wherein aperture 206 is uncovered, flywheel 224 rotates in a counterclockwise direction, the striking surface of flywheel 224 contacting impact surface 228 of first latch 218 and so rotating first latch 218 as to release arm 220, thereby permitting ring 210 to rotate in a counterclockwise direction under the urging of spring 212. In the preferred embodiment, it is desirable that the rotation of drive ring 210 and the uncovering of aperture 237 by the shutter blade of shutter mechanism 234 occur at approximately the same time. By adjusting the tension on spring 230 and thereby controlling the rotational speed of flywheel 224, the time interval taken for flywheel 224 to rotate from its latch position to a position wherein striking surface 226 engages latch 218 may be substantially equated to the "time-to-open" interval of the shutter mechanism.

The rotation of drive ring 210 in a clockwise direction so pivots blades 202 about pivots 204 and pivots 208 as to symmetrically open an increasing effective exposure aperture which becomes maximum upon engagement of arm 220 with a means, such as stop pin 242, for preventing any further rotation of drive ring 210. It should be noted that the effective exposure aperture presented by the opening movement of blades 202 is a function of the speed of movement of drive ring 210 which in turn is dependent upon the force exerted by spring 212. Consequently, the time interval required for blades 202 to complete their movement from the closed position to the open position may be varied in accordance with the adjustment of the tension on spring 212 as determined by adjusting screw 216. It is preferred that the time interval required for blades 202 to move from the closed to the open position be at least equal to the maximum exposure time internal of shutter mechanism 234. This arrangement of parts provides a shutter mechanism wherein the effective exposure aperture area is a function of only the time interval from actuation. The combination with a shutter means wherein the exposure time is a function of a variable blade speed greatly enlarges the exposure values available.

Figure 13:
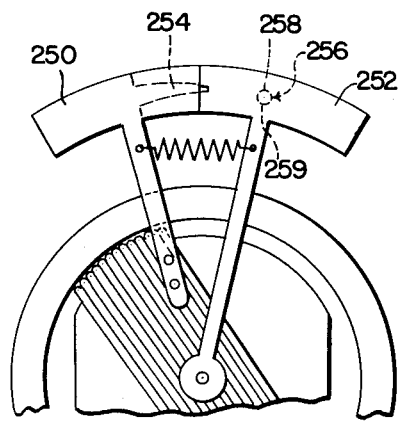
FIG. 13 is a schematic plan view of yet another form of the invention.

It is possible to synchronize a changing exposure aperture to shutter motion in other ways than the simultaneous initiation of operation as described. In particular, the shutter, such as shown in FIG. 13 and which operates by retarding the closing half of a traveling slot, lends itself to such synchronization. In FIG. 13 is shown a shutter mechanism similar to that of FIG. 1 and having a controlled blade 250 and an independent blade 252. It should be noted, however, that the independent blade 252 has a variable opening therein such as slot 254 which is progressively wider in a direction extending radially from lens exposure aperture 256 and which is initially narrower than the full lens aperture. Thus, when the independent blade, in motion, first admits lights, it still masks off the upper portion 258 and lower portion 259 of the aperture 256. If the controlled blade 250 is close behind, the exposure aperture 256 will never be fully uncovered. However, if the controlled blade 250 is retarded greatly to accomplish a long exposure, the independent blade will have moved sufficiently such that the exposure aperture is uncovered completely. It should be noted that this arrangement of parts masks the exposure aperture in only one dimension. The exposure aperture may be masked in another dimension by disposing a masking element perpendicularly to the long axis of slot 254 and partly covering the aperture, the masking elements being movable to an uncovering position when blade 252 has traveled to a predetermined position.

Mechanisms schematically shown in the drawings indicate a plurality of elements which are in the preferable form for performing various functions as hereinbefore described. However, it will be evident that certain of these elements may be readily altered in form or interchanged with further modification and that numerous other elements could be employed within the scope of the invention to perform similar functions. For instance, an electromagnet may be substituted for the permanent magnet; also, means for setting the shutter mechanisms and means for releasing said shutter mechanisms are well known in the art and have, on the whole been omitted. It is also readily apparent that the within invention may be adapted for use with a wide variety of other photographic elements such as means for limiting effective exposure aperture areas such as diaphragms of various types. It should be particularly noted that most of the forms of the mechanisms herein disclosed include a means for accelerating a shutter blade to an initially high speed for providing a substantially constant "time-to-open" interval. Although the mechanisms are operational without such an accelerating means, the inclusion of such a means is greatly preferred as it contributes to maintain the approximate invariance of the "time-to-open" interval and substantially enlarges the range of exposure values attainable.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An exposure control device for a photographic shutter mechanism which includes a movable means, the exposure time of said shutter mechanism being a function of the speed of movement of said movable means, said control device comprising an electromagnetic means which includes a magnetic element having a first magnetic field associated therewith, a flux-conducting means so disposed relative to said magnetic element as to intensify said first magnetic field, an electrically conducting element disposed about said flux-conducting means, said magnetic element being movable in response to motion of said movable means and with respect to said electrically con-

17 ducting element for inducing a second magnetic field associated with said conducting element, the magnetic flux of said second magnetic field being opposed to the magnetic flux of said first magnetic field, and means for controlling the product of the magnitudes of said fields for varying said exposure time.

2. An exposure control device for a photographic shutter mechanism which includes a movable menas, the exposure time of said shutter mechanism being a function of the speed of movement of said movable means, said control device comprising an electromagnetic means which includes a magnetic element having a first magnetic field associated therewith, a flux-conducting means so disposed relative to said magnetic element as to intensify said first magnetic field, an electrically conducting element disposed about said flux-conducting means, said magnetic element being movable in response to motion of said movable means and with respect to said electrically conducting element for inducing a second magnetic field associated with said conducting element, and means for controlling the product of the magnitudes of said fields for varying said exposure time.

3. An exposure control device as defined in claim 2, wherein said magnetic element comprises a permanent magnet.

4. An exposure control device as defined in claim 2, wherein said electrically conducting element comprises a coil having at least one full turn.

5. In a shutter mechanism, an electromagnetic device for automatically controlling the shutter exposure time interval responsively to electrical signals produced by a photosensitive means in accordance with the intensity of light incident thereon, said shutter mechanism including a movable means, said exposure time interval being a function of the speed of movement of said movable means, said electromagnetic device comprising a magnetic element having a first magnetic field associated therewith, flux-conducting means so disposed relative to said magnetic element as to intensify said first magnetic field and including an electrically conducting element disposed about said flux-conducting means, said magnetic element being movable in response to motion of said movable means and with respect to said conducting element for inducing a second magnetic field associated with said conducting element, said conducting element being electrically coupled with said photosenstive means for controlling the magnitude of said second magnetic field in accordance with said electrical signals.

6. An exposure control device for a shutter mechanism which includes a movable means, the exposure time of said shutter mechanism being a function of the speed of movement of said movable means, said control device comprising an electromagnetic means which includes a magnetic element having a first magnetic field associated therewith, a flux-conducting means so disposed relative to said magnetic elements as to intensify said first magnetic field, an electrically conducting element disposed about said flux-conducting means, said magnetic element being movable in response to motion of said movable means and with respect to said electrically conducting element for inducing a second magnetic field associated with said conducting element, and an electrical circuit for controlling the product of the magnitudes of said fields for varying said exposure time, said circuit comprising a photosensitive means for producing electrical signals in accordance with the intensity of light incident thereon, and a variable impedance electrically coupled with said conducting element and with said photosensitive means for varying said second magnetic field in accordance with said electrical signals.

7. An exposure control device as defined in claim 6, wherein said photosensitive means comprises a photovoltaic cell, said impedance comprises an electrical resistance, and said circuit includes a means for varying said resistance responsively to said electrical signals.

18

8. An exposure control device for a shutter mechanism which includes a movable means, the exposure time of said shutter mechanism being a function of the speed of movement of said movable means, said control device comprising an electromagnetic means which includes a magentic element having a first magnetic field associated therewith, a flux-conducting means so disposed relative to said magnetic elements as to intensify said first magnetic field, an electrically conducting element disposed about said flux-conducting means, said magnetic element being movable in response to motion of said movable means and with respect to said electrically conducting element for inducing a second magnetic field associated with said conducting element, and an electrical circuit for controlling the product of the magnitudes of said fields for varying said exposure time, said circuit comprising a photoelectric means, and a source of electrical power for introducing an external current into said circuit and being so coupled with said photoelectric means that the magnitude of said external current is controllable by said photoelectric means in accordance with the intensity of light incident upon said photoelectric means, said source and said photoelectric means being coupled with said conducting element for varying the product of the magnitudes of said fields.

9. An exposure control device as defined in claim 8, wherein said power source comprises a battery and said photoelectric means comprises a photoconductive element, said battery and said photoconductive element being coupled in series with said conducting element.

10. An exposure control device as defined in claim 8, wherein said power source comprises an electrical generator and said photoelectric means comprises a photoconductive cell, said generator and said cell being coupled in series with one another and with said conducting element.

11. An exposure control device as defined in claim 8, wherein said photoelectric means is a photovoltaic element coupled in series with said conducting element.

12. An automatic exposure control device for a shutter mechanism which includes a movable means, the exposure time of said shutter mechanism being a function of the speed of movement of said movable means, said control device comprising an electromagnetic means which includes a magnetic element having a first magnetic field associated therewith, an electrically conducting main coil disposed in said first field, said main coil being movable in response to motion of said movable means and with respect to said magnetic element for inducing a second magnetic field associated with said main coil, an electrically conducting auxiliary coil disposed in said first field, said auxiliary coil being movable in response to motion of said main coil and with respect to said magnetic element for inducing a voltage in said auxiliary coil proportional to the speed of movement of said main coil, and an electrical circuit for controlling the product of the magnitudes of said fields for varying said exposure time, said circuit comprising a photovoltaic means for producing electrical signals in accordance with the intensity of light incident thereon, said photovoltaic means being coupled in series with said auxiliary coil and being so disposed that the voltage of said electrical signals is opposite in polarity to the voltage induced in said auxiliary coil, and an electronic switching means coupled with said auxiliary coil and photovoltaic means for actuation by the combined voltages thereof, said electronic switching means being coupled with said main coil for presenting an external impedance across said coil which impedance is variable in accordance with the magnitude of said combined voltages.

13. An automatic exposure control device as defined in claim 12, wherein said electronic switching means comprises a transistor.

14. A shutter for a photographic device, comprising means providing an exposure aperture, shutter means mounted for movement with respect to said aperture for effecting an exposure therethrough, electrical motor means comprising a magnetic flux-conducting means having at least a single discontinuity therein, a magnetic element having a permanent magnetic field associated therewith and being movable in a predetermined path adjacent said flux-conducting means and across said discontinuity, an electrically conducting means associated with said magnetic flux-conducting means such that movement of said magnetic element across said discontinuity induces a current in said electrically conducting means, said magnetic element being so coupled with said shutter means that said shutter means is movable directly in response to movement of said magnetic element, photosensitive means for producing electrical signals in accordance with the intensity of light incident thereon, means for electrically coupling said photosensitive means with said motor means for varying the speed of movement of said shutter means in accordance with said electrical signals, and an electrical power source for providing electrical power for operating said motor means.

15. An exposure control device for a shutter mechanism which includes a movable means, the exposure time of said shutter mechanism being a function of the speed of movement of said movable means, said control device comprising, in combination, a magnetizable element providing a predeterminedly shaped space, a movable bipolar magnetic element disposed within said space for inducing a magnetic flux in said magnetizable element, an elongated electrically conducting element disposed about a portion of said magnetizable element approximately perpendicularly to the direction of said flux, said magnetizable element having a discontinuity therein for introducing a higher reluctance into the path of said flux, said magnetic element being movable between a first position wherein one pole is disposed adjacent one side of said discontinuity and a second position wherein said one pole is disposed adjacent the opposite side of said discontinuity in response to motion of said movable means for reversing the direction of said flux in said magnetizable element.

16. An exposure control device for a shutter mechanism which includes a movable means, the exposure time of said shutter mechanism being a function of the speed of movement of said movable means, said control device comprising, in combination, a magnetizable element which is shaped to include an enclosed space, a movable bipolar magnetic element disposed within said enclosed space for inducing a magnetic flux in said magnetizable element, an elongated electrically conducting element disposed about a first portion of said magnetizable element approximately perpendicular to the direction of said flux, a discontinuous space disposed in said magnetizable element in a second portion thereof and approximately perpendicularly to the path of said flux for introducing a high reluctance into said path, said magnetic element being movable between a first position where one pole is disposed adjacent one side of said discontinuous space and a second position wherein said one pole of said magnetic element lies adjacent the opposite side of said discontinuous space, said one pole being movable between said first position and said second position at a distance from said second portion just commensurate with free movability of said magnetic element, said magnetic element being movable in response to motion of said movable means from one of said positions to the other of said positions for reversing the direction of said flux in said magnetizable element during movement of said pole across said discontinuous space.

17. An exposure control device as defined in claim 16, wherein said magnetizable element comprises a substance characterized by having a magnetic permeability of not less than 7,000 c.g.s. units and a saturation level of approximately 20,000 gauss, and said magnetic element comprises a permanent magnet having an energy product of at least $4.5 \times 10^6$ ergs per cubic centimeter.

18. An exposure control device for a shutter mechanism which includes a movable means, the exposure time of said shutter mechanism being a function of the speed of movement of said movable means, said control device comprising an electrodynamic device, a control circuit, and a photosensitive means for producing electrical signals in accordance with the intensity of light incident thereon, said electrodynamic device including a magnetizable ring, a movable permanent magnet disposed within said ring for inducing a magnetic flux in said ring, said ring having a transverse gap therein for introducing a high reluctance into said ring, an electrical coil having two portions disposed about said ring, the bulk of each of said portions being disposed at approximately 90° to either side of said gap for permitting limited movement of said permanent magnet between a first position wherein one pole of said magnet lies adjacent one side of said gap and a second position wherein said one pole of said magnet lies adjacent the opposite side of said gap, said magnet being attached to and movable in unison with said movable means, said control circuit comprising an electronic switching means electrically connected to said coil for presenting a variable external impedance to said coil, and a network electrically connected to said electronic switching means for varying the external impedance thereof in accordance with the intensity of said electrical signals, said network comprising a resistive impedance electrically connected in series with said photosensitive means.

19. A shutter for a photographic device, comprising a housing means having an exposure aperture therein, a shutter blade having an opening therein and being mounted for movement between a first position wherein said opening is to one side of said aperture and a second position wherein said opening is to an opposite side of said aperture, means for moving said shutter blade from said first position to said second position, a flux-conducting element mounted on said housing adjacent said aperture, an electrically conducting coil wound about said flux-conducting element, and a magnetic element having a first magnetic field associated therewith and being mounted for movement with respect to said coil for inducing a current in said coil, said shutter blade being so connected to and movable in unison with said magnetic element as to induce in said coil a current which has associated therewith a second magnetic field which is opposed to said first magnetic field and retards the movement of said shutter blade.

20. A shutter mechanism comprising, in combination, means providing an exposure aperture, movable means for effecting a variable exposure time interval through said aperture, means for moving said movable means, an iris mechanism comprising a plurality of radially movable blades and normally disposed in covering position relative to said exposure aperture, said blades being movable from said covering position wherein said exposure aperture has a predetermined minimum effective area to an uncovering wherein said exposure aperture has a predetermined maximum effective area, means for moving said blades, the time interval required for moving said blades from said covering position to said uncovering position being substantially fixed, and means for synchronizing the movement of said blades from said covering to said uncovering position with movement of said means for effecting an exposure interval so that the variable exposure time interval provided by the latter movement occurs during said fixed time interval.

21. An automatic exposure control device for a shutter mechanism which includes a movable means, the exposure time of said shutter mechanism being a function of the speed of movement of said movable means, said control device comprising an electromagnetic means which includes a magnetic element having a first magnetic field associated therewith, an electrically conducting main element disposed in said first field, one of said elements being movable in response to motion of said movable means and with respect to the other of said elements for inducing a second magnetic field associated with said main element, an electrically conducting auxiliary element disposed in said first field and being so disposed relative to said main element that motion of said one of said elements in response to motion of said movable means and with respect to the other of said elements induces a voltage in said auxiliary element, said voltage being proportional to said second magnetic field, and a circuit comprising an electronic switching means electrically coupled with said auxiliary element, a photoconductive member electrically coupled in parallel with said auxiliary element for controlling the voltage impressed by said auxiliary element upon said electronic switching means for controlling the actuation of said electronic switching means, said electronic switching means being coupled with said main element for varying the external impedance across said main element.

22. An exposure control device as defined in claim 21 wherein said electrically conducting main element comprises a first coil, said electrically conducting auxiliary element comprises a second coil and said electronic switching means comprises a transistor.

References Cited in the file of this patent

UNITED STATES PATENTS

| | | |
|---|---|---|
| 2,013,362 | Riszdorfer | Sept. 3, 1935 |
| 2,179,717 | Fedotoff | Nov. 14, 1939 |
| 2,325,463 | Axler | July 27, 1942 |
| 2,387,466 | Rath | Oct. 23, 1945 |
| 2,390,216 | Guedon | Dec. 4, 1945 |
| 2,504,681 | Hall | Apr. 18, 1950 |
| 2,511,201 | Fuerst | June 13, 1950 |
| 2,527,780 | Willcox | Oct. 31, 1950 |
| 2,625,088 | Fuerst | Jan. 13, 1953 |
| 2,638,825 | Fairbank | May 19, 1953 |
| 2,780,971 | Fahlenberg | Feb. 12, 1957 |
| 2,796,010 | Gannett | June 18, 1957 |
| 2,836,774 | Ashworth | May 27, 1958 |
| 2,887,025 | Rentschler et al. | May 19, 1959 |

UNITED STATES PATENT OFFICE
CERTIFICATE OF CORRECTION

Patent No. 3,056,341            October 2, 1962

David S. Grey

It is hereby certified that error appears in the above numbered patent requiring correction and that the said Letters Patent should read as corrected below.

Column 14, line 17, for "valves" read -- values --; lines 35 and 36, for "apertures" read -- aperture --; line 55, after "210" insert -- and --; column 18, line 6, for "magentic" read -- magnetic --; column 19, line 58, for "where" read -- wherein --; column 20, line 60, after "uncovering" insert -- position --

Signed and sealed this 1st day of October 1963.

(SEAL)
Attest:

ERNEST W. SWIDER

Attesting Officer

DAVID L. LADD

Commissioner of Patents